United States Patent [19]

Aramaki et al.

[11] Patent Number: 5,240,548
[45] Date of Patent: Aug. 31, 1993

[54] RECORDING MEDIUM ASSEMBLING APPARATUS

[75] Inventors: Shotoku Aramaki, Kanagawa; Shuichi Kikuchi, Miyagi, both of Japan

[73] Assignee: Sony Corporation, Tokyo, Japan

[21] Appl. No.: 690,504

[22] Filed: Apr. 24, 1991

[30] Foreign Application Priority Data

Apr. 27, 1990 [JP] Japan .................................. 2-114217
May 31, 1990 [JP] Japan .................................. 2-142504

[51] Int. Cl.⁵ .......................................... B32B 31/00
[52] U.S. Cl. ................................. 156/556; 100/268; 100/281; 100/291; 156/557; 156/567
[58] Field of Search ............... 156/556, 557, 567, 566, 156/541; 100/281, 282, 283, 291, 265, 268

[56] References Cited

U.S. PATENT DOCUMENTS

| 6,101 | 2/1849 | Kellogg | 100/268 |
|---|---|---|---|
| 1,945,496 | 1/1934 | Sloan et al. | 100/281 |
| 3,043,175 | 7/1962 | Gallob | 100/283 |
| 3,108,558 | 10/1963 | Galvin | 100/281 |
| 4,034,666 | 7/1977 | Bigun et al. | 100/281 |
| 4,152,566 | 5/1979 | Mägerle | 156/556 |
| 4,687,536 | 8/1987 | Hiramatsu et al. | 156/556 |
| 4,704,181 | 11/1987 | Kubo | 156/540 |
| 4,960,480 | 10/1990 | Iwamoto | 156/556 |
| 5,080,736 | 1/1992 | Matsui | 156/556 |
| 5,085,723 | 2/1992 | Nakaki et al. | 156/556 |

FOREIGN PATENT DOCUMENTS 1124269 10/1956 France .................. 100/281

Primary Examiner—David A. Simmons
Assistant Examiner—William J. Matney, Jr.
Attorney, Agent, or Firm—Philip M. Shaw, Jr.

[57] ABSTRACT

An apparatus for assembling a recording medium having a recording disc and a center core having an adhesive coated area of attachment to the recording disc. The apparatus includes a horizontal base member, a support member rigidly fixed on the base member, and a core support table secured on the base member for carrying the center core placed thereon. The recording disc is placed on the attachment area of the center core placed on the core support table. A pushing tool is supported for vertical movement along the support member toward and away from the core support table. The pushing tool is moved downward to push the recording disc against the attachment area of the center core so as to bond the recording disc on the center core.

10 Claims, 17 Drawing Sheets

RECORDING MEDIUM ASSEMBLING APPARATUS

BACKGROUND OF THE INVENTION

This invention relates to an apparatus for assembling a recording medium having a recording disc and a center core having an area of attachment to the recording disc.

Recording medium assembling apparatus have been proposed to assemble a recording medium having a recording disc and a center core having an area of attachment to the recording disc by coating an adhesive on the attachment area of the center core, placing the recording disc on the adhesive coated attachment area of the center core, and pushing the recording disc against the adhesive coated attachment area of the center core. It is the current practice to employ a pushing tool for pushing the recording disc against the adhesive coated attachment area of the center core placed in position on a core support table. The pushing tool is moved toward and away from the core support table by an air cylinder including a plunger having its forward end secured to the pushing tool. One problem which occurs with this type of recording medium assembling apparatus is the tendency of the pushing force to move laterally with respect to the core support table, causing a lateral deviation of the recording disc with respective to the center core. Additionally, it is very difficult, if not impossible, to adjust the pressure applied on the recording disc. As a result, the adhesive height is different from one recording medium to another.

SUMMARY OF THE INVENTION

Therefore, it is a main object of the invention to provide an improved recording medium assembling apparatus which can assemble recording mediums with high accuracy.

Another object of the invention is to provide an improved recording medium assembling apparatus which can assemble a recording medium with no deviation of its recording disc with respect to its center core.

Still another object of the invention is to provide an improved recording medium assembling apparatus which can assemble recording mediums free from deformation or distortion.

There is provided, in accordance with the invention, an apparatus for assembling a recording medium having a recording disc and a center core having an adhesive coated area of attachment to the recording disc. The apparatus comprises a horizontal base member, a support member rigidly fixed on the base member, a core support table secured on the base member for carrying the center core placed thereon, means for placing the recording disc on the attachment area of the center core placed on the core support table, a pushing tool supported for vertical movement along the support member toward and away from the core support table, and an actuator for moving the pushing tool downward to push the recording disc against the attachment area of the center core so as to bond the recording disc on the center core.

In another aspect of the invention, there is provided an apparatus for assembling a recording medium having a recording disc and a center core, the center core including a cylindrical center portion having a circular upper end surface and a peripheral annular flange portion formed along the lower end of the cylindrical center portion, the peripheral flange portion having an adhesive coated area of attachment to the recording disc, the recording disc being formed with a center hole having a diameter for receipt of the center portion of the center core. The apparatus comprises a horizontal base member; a core support table secured on the base member for carrying the center core placed thereon; means for placing the recording disc on the attachment area of the center core placed on the core support table; a pushing tool supported for vertical movement toward and away from the core support table, the pushing tool including a cylindrical housing having an annular lower end surface for pushing the peripheral flange portion against the core support table, a pushing member placed for sliding movement within the cylindrical housing, the pushing member having a circular lower end surface for pushing the central portion of the center core against the core support table, and a spring for urging the circular pushing member toward the core support table; and an actuator for moving the pushing tool downward to push the recording disc against the attachment area of the center core so as to bond the recording disc on the center core.

In another aspect of the invention, there is provided an apparatus for assembling a recording medium including a recording disc and a center core having an area of attachment to the recording disc. The apparatus comprises an adhesive coating unit including means for heating the center core, and means for coating an adhesive to the attachment area of the heated center core; and a unit for pushing the recording disc against the adhesive coated attachment area of the center core so as to bond the recording disc on the center core.

In another aspect of the invention, there is provided an apparatus for assembling a recording medium including a recording disc and a center core having an area of attachment to the recording disc. The apparatus comprises an adhesive coating unit including an adhesive injector having a nozzle for discharging an adhesive to coat the attachment area of the center core with the adhesive, and a heater element surrounding the nozzle for heating the adhesive in the nozzle; and a unit for pushing the recording disc against the adhesive coated attachment area of the center core so as to bond the recording disc on the center core.

In still another aspect of the invention, there is provided an apparatus for assembling a recording medium including a recording disc and a center core having an area of attachment to the recording disc. The apparatus comprises an adhesive coating unit for coating an adhesive on the attachment area of the center core, the adhesive being a hot-melt adhesive containing 3 to 10 percent by weight of inorganic fillers; and a unit for pushing the recording disc against the adhesive coated attachment area of the center core so as to bond the recording disc on the center core.

BRIEF DESCRIPTION OF THE DRAWINGS

This invention will be described in greater detail by reference to the following description taken in connection with the accompanying drawings, in which like reference numerals refer to the same or corresponding parts, and wherein.

DETAILED DESCRIPTION OF THE INVENTION

Figure 1:
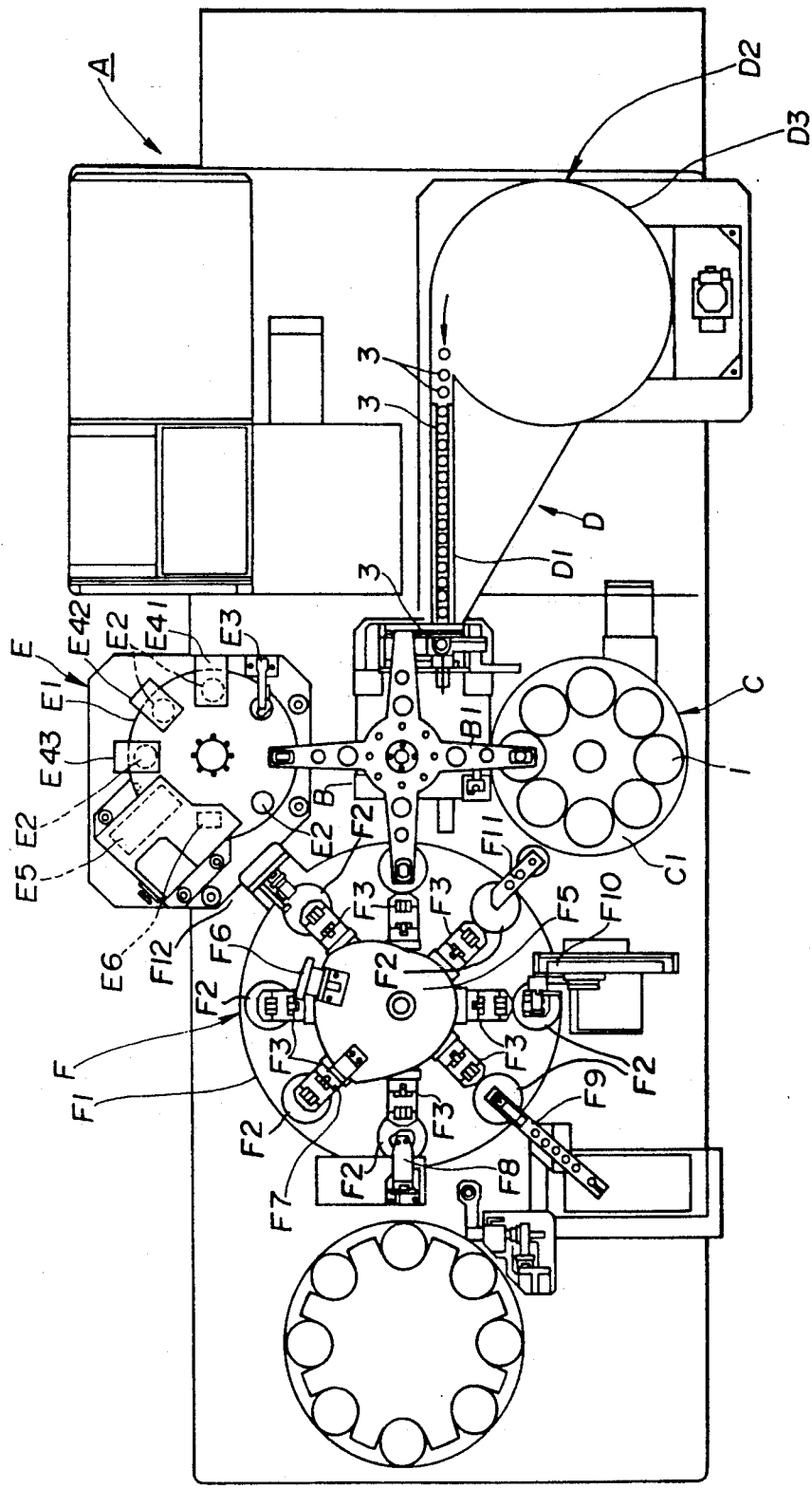
FIG. 1 is a plan view of a recording medium assembling machine embodying the features of the invention.
Figure 2:
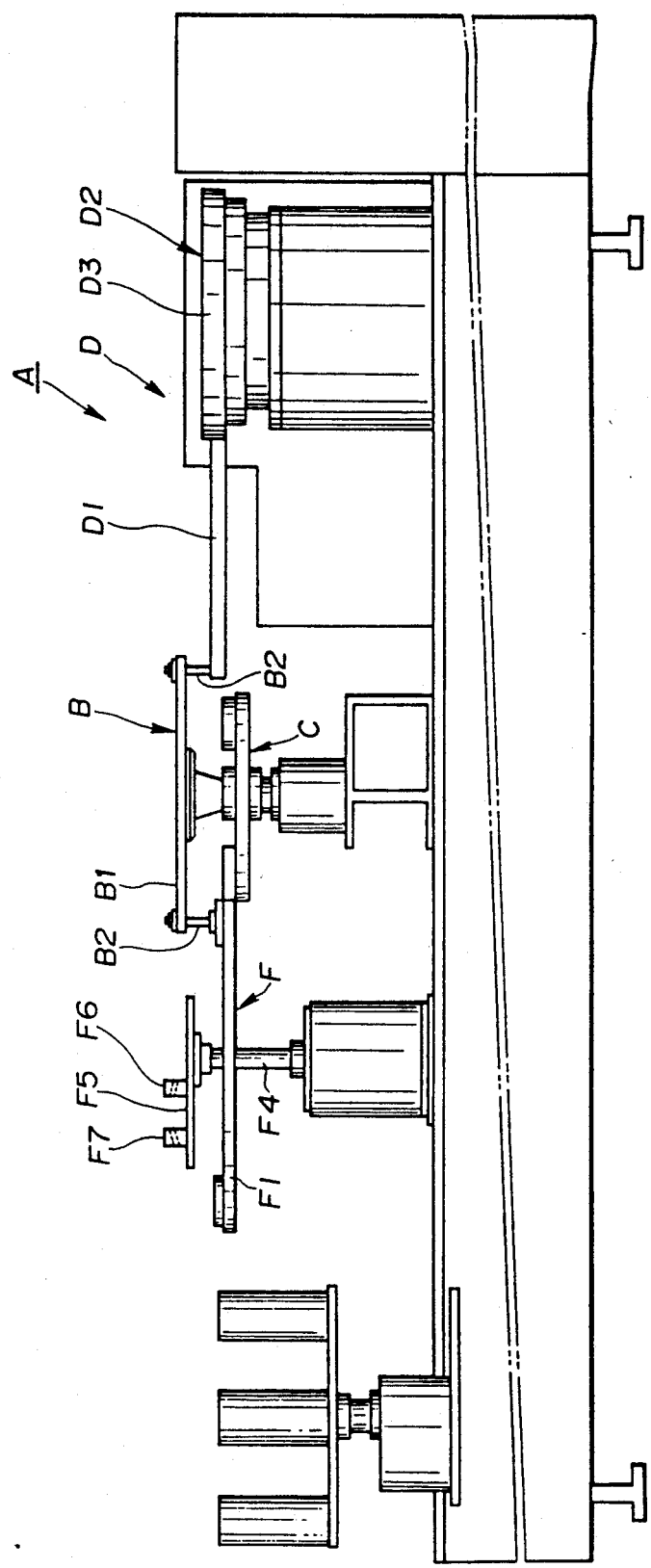
FIG. 2 is a side view of the recording medium assembling machine of FIG. 1.

Referring now to the drawings, wherein like reference numerals have been used throughout to indicate like elements, FIGS. 1 and 2 illustrates a magnetic recording medium assembling machine for sequentially bonding magnetic recording discs on respective center cores.

Basically, the magnetic recording medium assembling machine, generally designated by the character A, includes a transfer mechanism B shown as having four transfer arms B1 circumferentially spaced 90 degrees apart. The transfer arms B1 are supported for rotation in a counter-clockwise direction, as viewed in FIG. 1, to pass successively a disc supply station C, a core supply station D, an adhesive coating station E, and a bonding station F, all positioned around the transfer mechanism B. Each of the transfer arms B1 has a suction pipe B2 at its free end for transferring a magnetic recording disc 1 or a center core 3.

Figure 3:
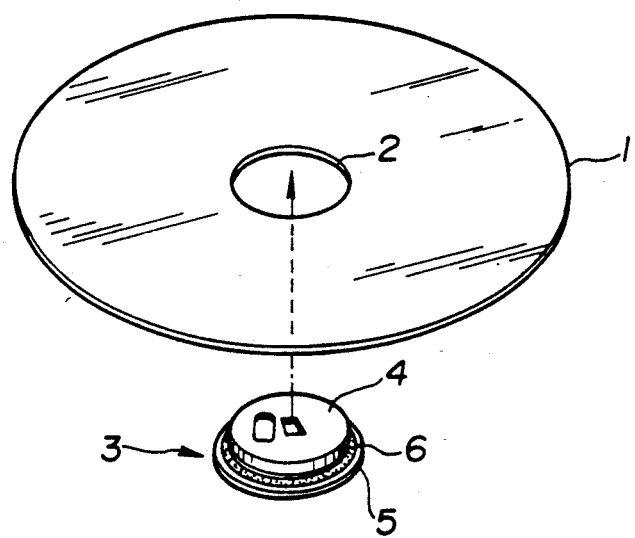
FIG. 3 is a perspective view showing a center core and a recording disc to be bonded on the center core so as to assemble a recording medium.

The disc supply station C includes a rotary table C1 having a number of (in the illustrated case 8) magnetic recording discs 1 successively transferred thereon through a disc feeder. The magnetic recording discs 1 have a circular center hole 2, as shown in FIG. 3. The core supply station D includes a linear core feeder D1 having a series of center cores 3 fed through a core feeder D2 from a core storage chamber D3. The center cores 3 have a cylindrical center boss 4 and a peripheral flange 5 formed along the lower end of the center boss 4, as shown in FIG. 3. The center boss 4 has a diameter suitable for insertion through the center hole 2 of the magnetic recording disc 1. The peripheral flange 5 is the area of attachment to the magnetic recording disc 1.

The adhesive coating station E includes a rotary table E1 carrying a number of (in the illustrated case 8) core support tables E2 equally spaced circumferentially. The rotary table E1 is supported for rotation in the counter-clockwise direction, as viewed in FIG. 1. The core support tables E2 are secured on the rotary table E1 for rotation in unison with the rotary table E1. The core support tables E2 have an upper end surface generally conforming to the rear surface of a center core 3 to ensure stable placement of the center core 3 thereon. With rotation of the rotary table E1, the core support tables E2 pass a core check sensor E3, first, second and third core heating units E41, E42 and E43, an adhesive coating unit E5 and an adhesive check sensor E6 in this order.

Figure 4:
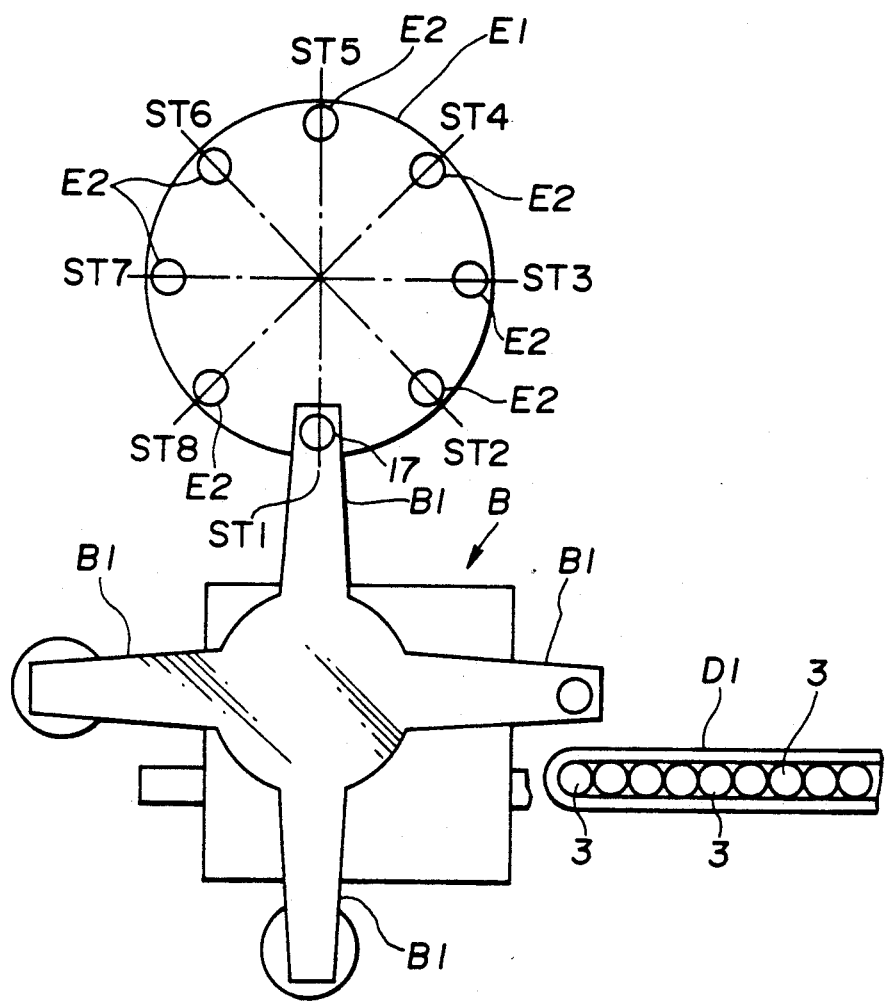
FIG. 4 is a plan view used in explaining positions for various processes performed in the adhesive coating station of the recording medium assembling machine.

With rotation of the rotary table E1, the core support tables E2 pass successively positions ST1 to ST8, as shown in FIG. 4. At the position ST1, a center core 3, which is transferred by the transfer arm B1 from the core supply station D to the adhesive coating station E, is placed on one of the core support tables E2. Each time the rotary table E1 rotates at an angle of 45 degrees, the core support tables E2 move from one position (for example, ST1) to the next position (for example, ST2). The core check sensor E3 is located to detect the presence of the center core 3 placed at the position ST2. The first, second and third core heating units E41, E42 and E43 are located to heat the center cores 3 placed at the respective positions ST3, ST4 and ST5. The adhesive coating unit E5 is located to coat an adhesive 6 on the peripheral flange 5 of the center core 3 placed at the position ST6. The adhesive check sensor E6 is located to detect the presence of the adhesive 6 coated on the flange portion 5 of the center core 3 placed at the position ST7. At the position ST8, the adhesive coated center core 3 is transferred by one of the transfer arm B1 from the adhesive coating station E to the disc bonding station F.

Figure 5:
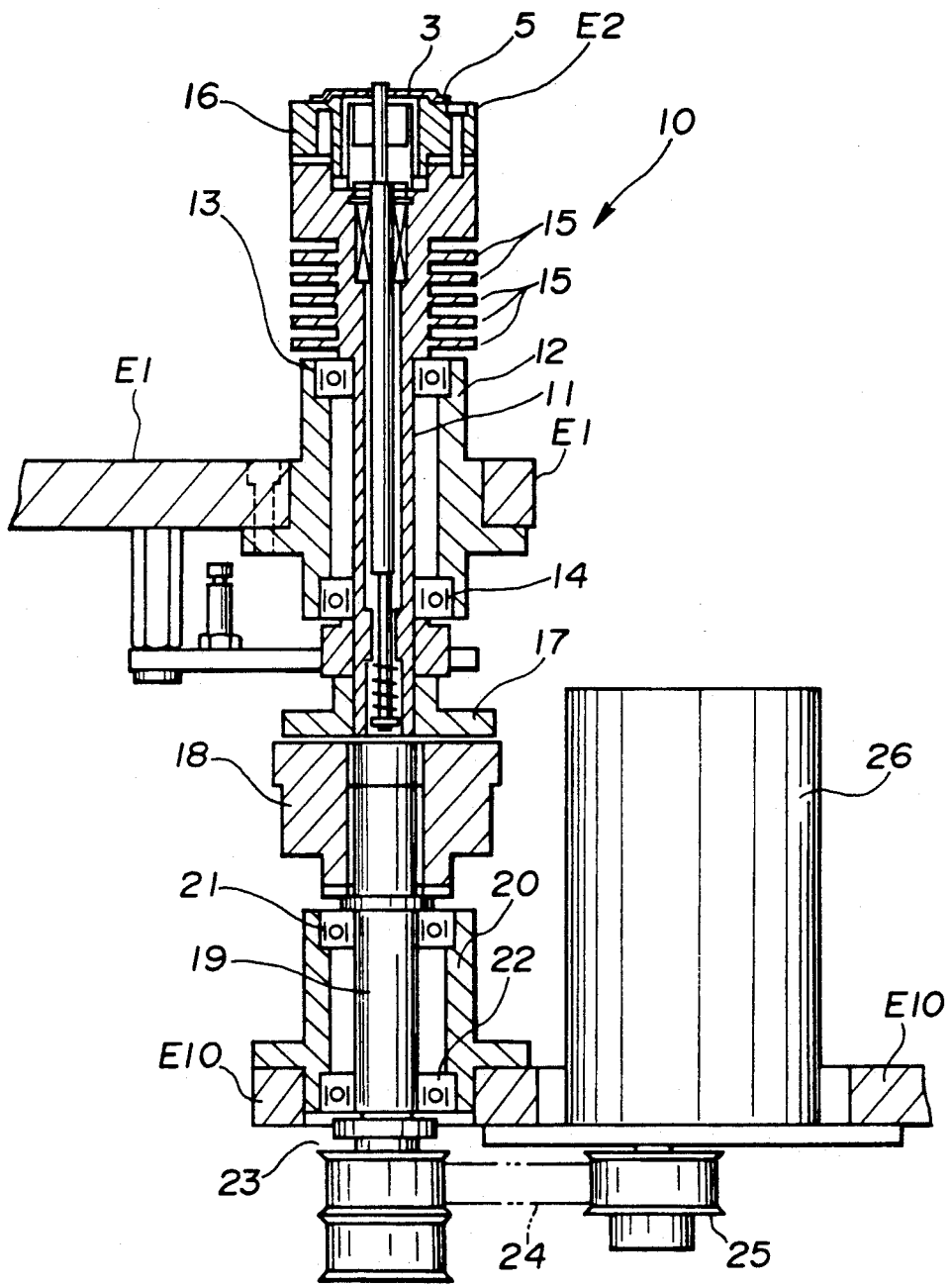
FIG. 5 is a vertical sectional view of a core support table drive unit used in the adhesive coating station.

Referring to FIG. 5, each of the core support tables E2 is mounted on a core support table drive unit 10. The drive unit 10 includes a rotary shaft 11 extending through a cylindrical bearing housing 12 fixed in a through-hole formed in the rotary table E1. Bearings 13 and 14 are mounted within the bearing housing 12 to rotatably support the intermediate portion of rotary shaft 11. The rotary shaft 11 has an upper portion formed with a number of heat radiating fins 15 and an annular head 16 to which the core support table E2 is attached. The rotary shaft 11 has a lower portion terminating in a clutch plate 17 for serration engagement with a clutch 18. The clutch 18 is supported on a clutch shaft 19 extending through a cylindrical bearing housing 20 fixed in a through hole formed in a base E10. The clutch 18 is adapted to vertically move into and out of engagement with the clutch plate 17. Bearings 21 and 22 are mounted within the bearing housing 20 to rotatably support the clutch shaft 19. The clutch shaft 19 is provided at its lower end with a pulley 23 around which a drive belt 24 extends. The drive belt 24 also loops around a pulley 25 fixed to the output shaft of a drive motor 26. A constant speed motor is used for effecting a constant rate turning of the core support table E2.

Figure 6:
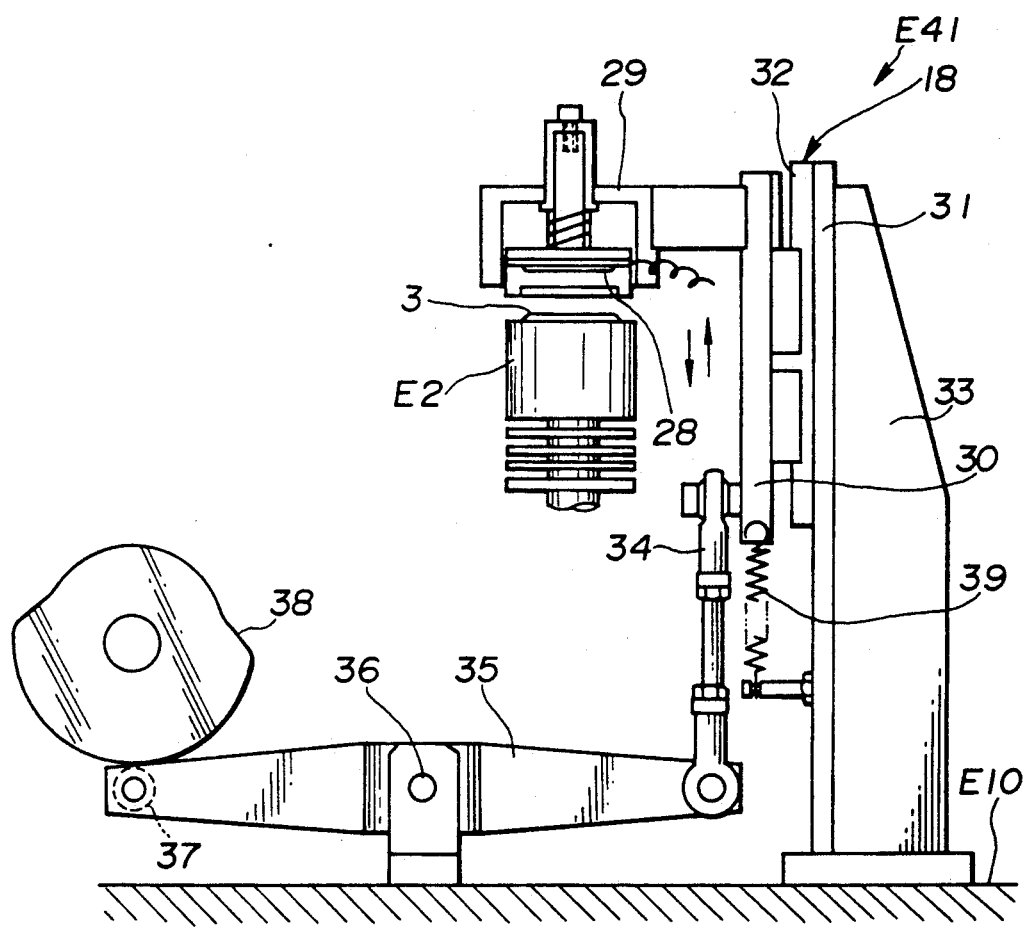
FIG. 6 is a side view of a core heating unit used in the adhesive coating station.

Referring to FIG. 6, the first core heating unit E41 includes a heater element 28 rigidly fixed in a heater holder 29. The heater holder 29 is supported with respect to the base E10 so that the heater element 28 faces to the core support table E2 placed at the position ST3 (FIG. 4). The heater holder 29 is advantageously reciprocated vertically to bring the heater element 28 toward and away from the rotary table E1 (FIG. 1). For this purpose, a vertically movable slide 30 connects the heater holder 29 to a vertical carriage 31 supported on a vertical strut 33 fixed on the base E10. The slide 30 is adapted to move vertically along ways 32 formed on the vertical carriage 31 under the influence of a cam mechanism. More particularly, the slide 30 is connected through a connection rod 34 to one end of a rocker arm 35 pivotally journalled intermediate its ends on a rocker arm shaft 36 supported on the base E10. The rocker arm 35 has a cam roller 37 mounted on the other end thereof for engagement with an eccentric cam member 38. A spring 39 is provided to urge the slider 30 downward so as to hold the cam roller 37 in engagement with the cam member 38. Rotation of the cam member 38 causes the rocker arm 35 to move the slide 30 upward against the resilient force of the spring 39 and downward under the resilient force of the spring 39. The cam member 38 has such a cam surface that the slide 30 moves downward to bring the heater element 28 to its lowermost position spaced at a predetermined distance away from the center core 3 positioned on the core support table E2 placed at the position ST3 (FIG. 4). The electric current supplied to the heater element 28 is controlled to heat the center core 3 at a predetermined temperature by the aid of a temperature sensor (not shown). The second and third heating units E42 and E43 are substantially the same as the first heating unit E41 except for the profile of the cam surface of the cam member 38. The cam member 38 of the second heating unit E42 has such a cam surface that the slide 30 moves downward to bring the heater element 28 to its lowermost position spaced at a predetermined distance away from the center core 3 positioned on the core support table E2 placed at the position ST4 (FIG. 4). The cam member 38 of the third heating unit E43 has such a cam surface that the slide 30 moves downward to bring the heater element 28 to its lowermost position spaced at a predetermined distance away from the center core 3 positioned on the core support table E2 placed at the position ST5 (FIG. 4).

It is to be understood that the center core 3 may be heated by bringing the heater element 28 into direct contact with the center core 3. Before the center core 3 is coated with an adhesive 6 at the position ST6 (FIG. 4), it is preheated at the positions ST3, ST4 and ST5 (FIG. 4) to prevent the adhesive temperature from dropping on the center core 3. This is effective to achieve uniform bonding of the magnetic recording disc 1 to the center core 3.

Figure 7:
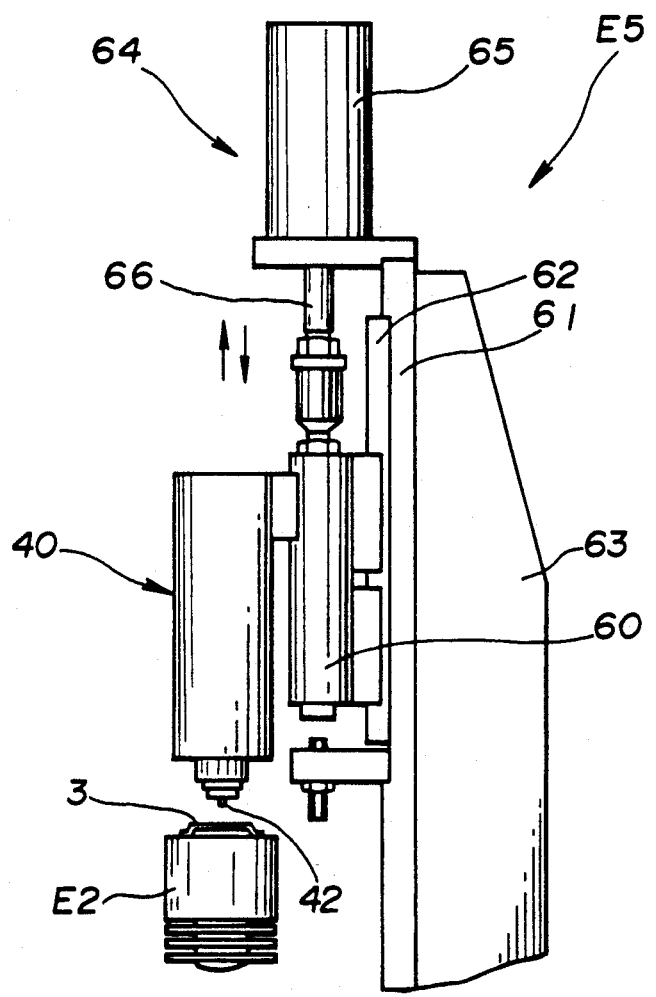
FIG. 7 is a side view of an adhesive coating unit used in the adhesive coating station.

Referring to FIG. 7, the adhesive coating unit E5 includes an adhesive injector 40 having a fixed metering orifice 42 for injecting adhesive to the peripheral flange 5 of the center core 3 placed on the core table E2 rotating about its vertical axis at the position ST6 (FIG. 4). The adhesive injector 40 is advantageously reciprocated vertically toward and away from the rotary table E1. For this purpose, the adhesive injector 40 is connected through a vertically movable slide 60 to a vertical carriage 61 supported on a vertical strut 63 fixed on the base E10. The slide 60 is adapted to move vertically along ways 62 formed on the carriage 61 under the influence of an air cylinder unit 64. The air cylinder unit 64 includes a cylinder 65 supported on the top of the vertical strut 63 and a plunger 66 connected to the slide 60. When a core support table E2 having a center core 3 placed thereon comes to the position ST6 (FIG. 4), the air cylinder unit 64 operates to move the slider 60 downward to bring the orifice 42 closer to the flange portion 5 of the center core 3. Next, the orifice 42 opens to discharge adhesive onto the flange portion 5 of the center core 3 rotating along with the core support table E2.

Figure 8:
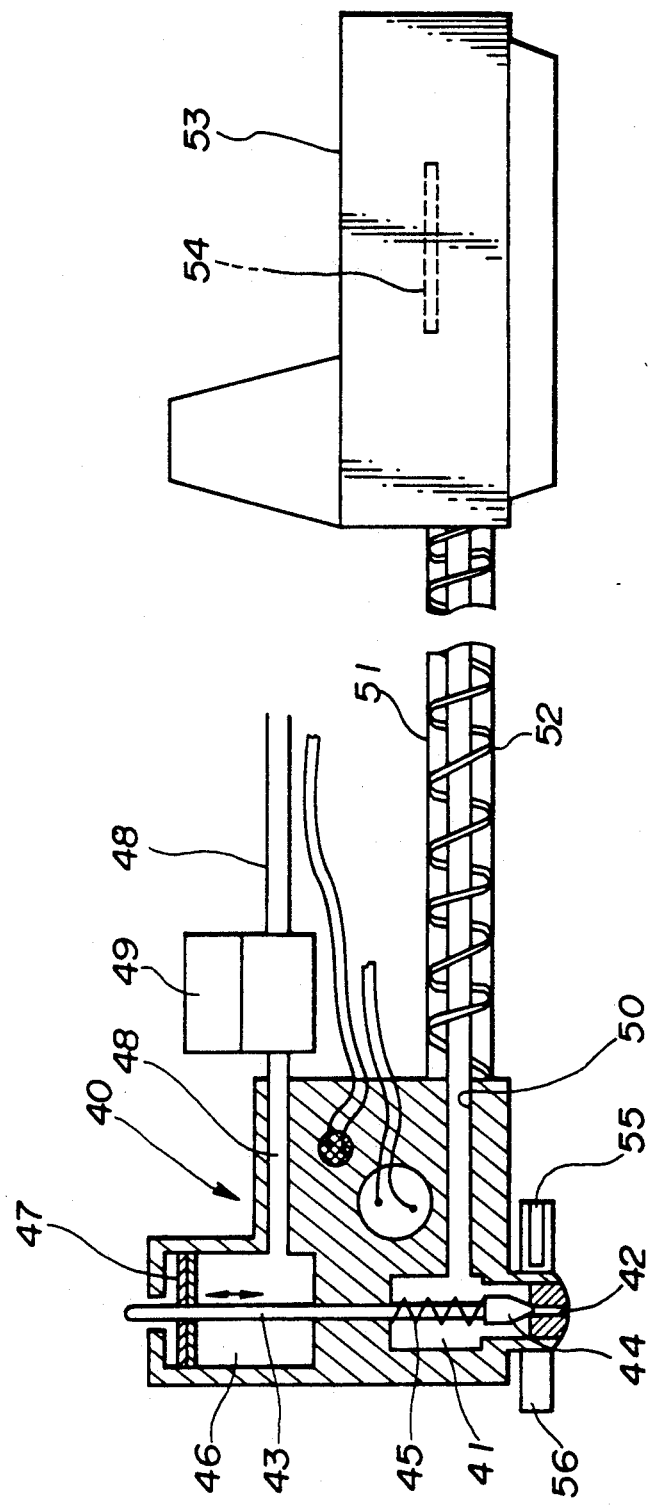
FIG. 8 is a horizontal sectional view of an adhesive injector used in the adhesive coating unit.

Referring to FIG. 8, the adhesive injector 40 includes a first housing 41 opening through the fixed metering orifice 42 and a plunger 43 having a needle valve 44 at its forward end. The plunger 43 is supported within the first housing 41 for reciprocation between a fully-open position and a fully-closed position. In the fully-open position, the needle valve 44 is spaced from the orifice 42 and in the fully-closed position, the needle valve 44 is closed against the orifice 42. A bias spring 45 is provided around the plunger 43 within the first housing 41 to bias the plunger 43 toward its closed position. The plunger 43 also has a piston 47 placed for sliding movement within a second housing 46 to divide the second housing 46 into two chambers on the opposite sides of the piston 47. The first chamber is connected to the atmosphere and the second chamber is connected to an air pump (not shown) through an air passage 48 having a solenoid valve 49. When the solenoid valve 49 is energized, air is introduced into the first chamber to move the piston 47, together with the plunger 43, against the resilient force of the spring 45 so as to open the orifice 42.

The first housing 41 is connected through an adhesive passage 50 to an adhesive hose 51 which in turn is connected to an adhesive tank 53. The adhesive tank 53 contains an adhesive 6. A pump (not shown) is provided to supply the adhesive from the adhesive tank 53 to the first housing 41. The adhesive tank 53 has a heater 54 placed therein for heating the adhesive 6 contained in the adhesive tank 53. The electric current supplied to the heater 54 is controlled by the aid of a thermocouple (not shown) to achieve a constant adhesive temperature and thus a constant adhesive viscosity. Similarly, the adhesive hose 51 has a heater 52 for heating the adhesive in the adhesive hose 51. The electric current supplied to the heater 52 is controlled by the aid of a thermocouple (not shown) to achieve a constant adhesive temperature and thus a constant adhesive viscosity. A heater 55 is provided for heating the orifice 42 to maintain the adhesive in the orifice 42 at a constant temperature. Preferably, the heater 55 has an annular heater element surrounding the orifice 42. The electric current supplied to the heater 55 is controlled by the aid of a thermocouple 56 to achieve a constant adhesive temperature and thus a constant adhesive viscosity.

Figure 9A:
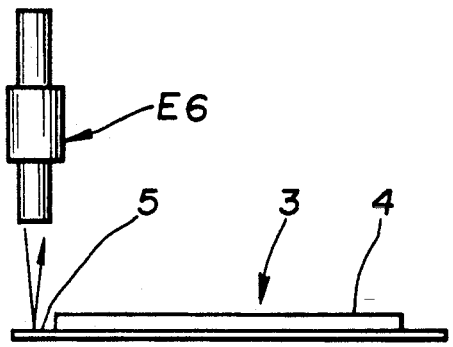
FIGS. 9A and 9B are schematic views used in explaining an adhesive check sensor used in the adhesive coating unit.
Figure 9B:
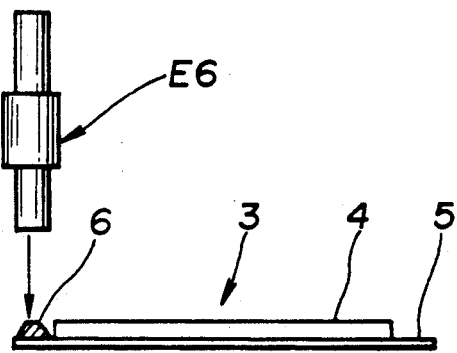

Referring to FIGS. 9A and 9B, the adhesive check sensor E6 is located to detect the presence of the adhesive 6 coated on the peripheral flange 5 of the center core 3 placed at the position ST7 (FIG. 4). The adhesive check sensor E6 is adapted to emit a light ray toward the flange portion 5 of the center core 3. If no adhesive exists on the flange portion 5 of the center core 3, adhesive check sensor E6 will receive the light ray reflected from the flange portion 5 of the center core 3, as shown in FIG. 9A. If the center core 3 is coated with the adhesive 6, the emitted light lay will be dispersed on the adhesive 6, as shown in FIG. 9B.

Figure 11:
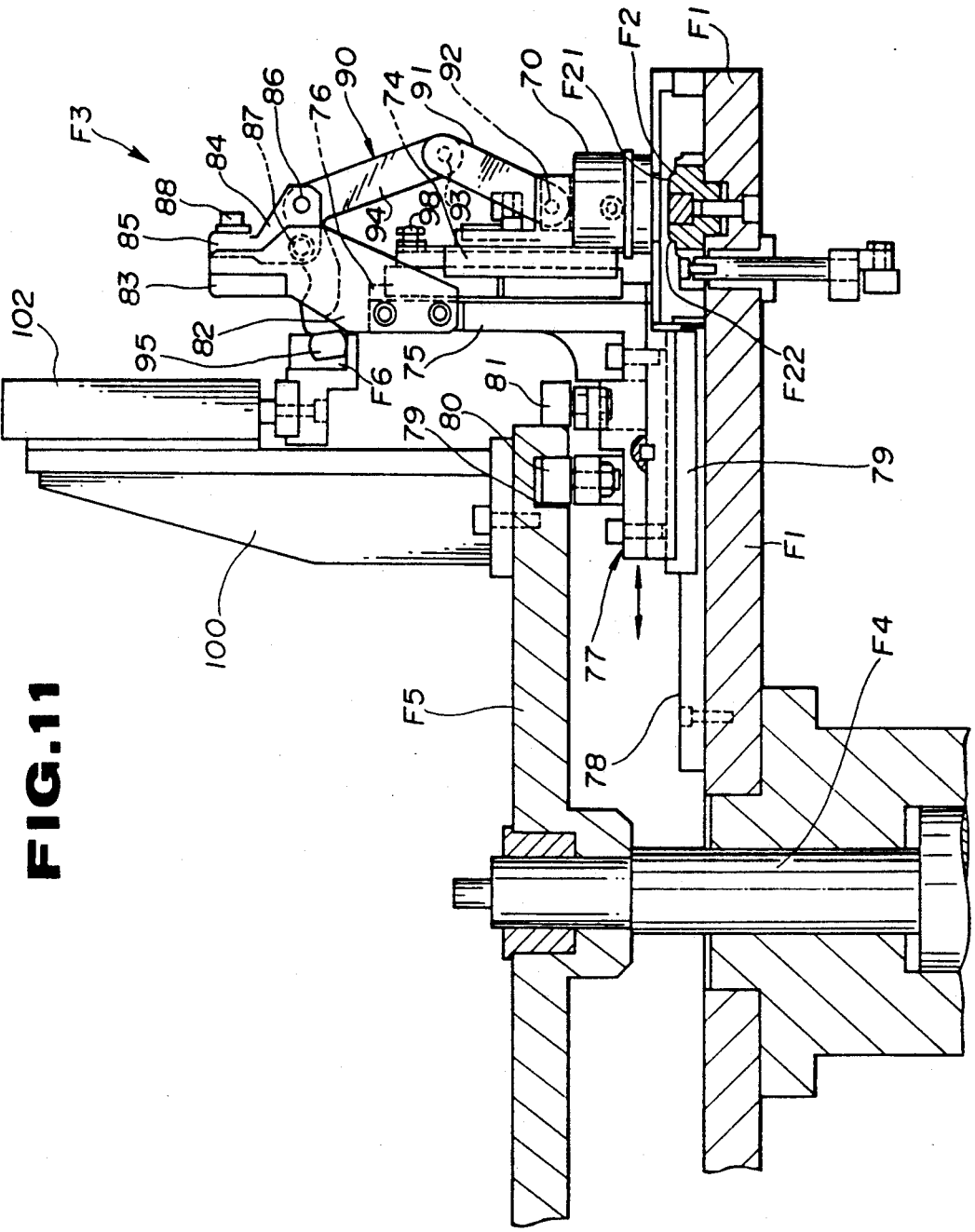
FIG. 11 is a side view in section showing a bonding unit used in the bonding station.

Returning to FIGS. 2 and 11, the bonding station F includes a rotary table F1 carrying a number of (in the illustrated case 8) core support tables F2 equally spaced circumferentially and bonding units F3 supported thereon for radial sliding movement toward and away from the respective core support tables F2. The rotary table F1 is supported for rotation in the counter-clockwise direction, as viewed in FIG. 1, around a fixed shaft F4. The fixed shaft F4 has a cam plate F5 secured thereto to move the bonding units F3 radially of the rotary disc F1 with rotation of the rotary disc F1. The cam plate F5 has first and second operation members F6 and F7 secured thereto for operating the bonding units F3. The bonding station F also includes a medium height check sensor F8, first and second recovery units F9 and F10, and a medium check sensor F11.

Figure 10:
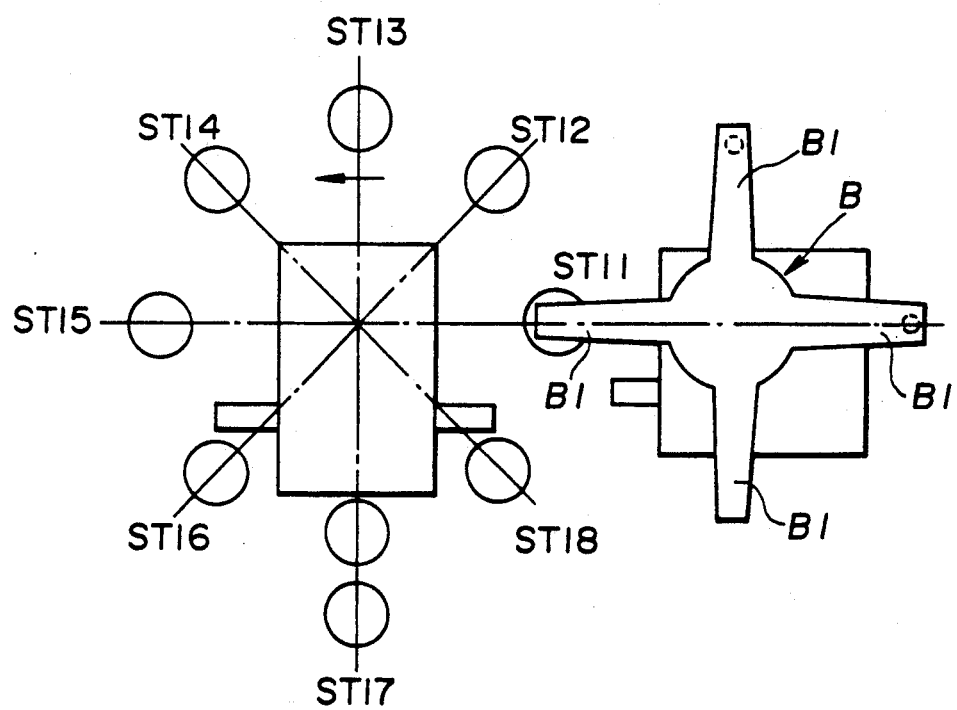
FIG. 10 is a plan view used in explaining positions for various processes made in the bonding station of the recording medium assembling machine.

With rotation of the rotary table F1, the core support tables F2, together with the bonding units F3, pass successively positions ST11 to ST18, as shown in FIG. 10. At the position ST11, an adhesive coated center core 3, which is transferred by the transfer arm B1 from the adhesive coating station E to the bonding station F, is placed on one of the core support tables F2 and a magnetic recording disc 1, which is transferred by the transfer arm B1 from the disc supply station C to the bonding station F, is placed on the adhesive coated center core 3 to assemble a magnetic recording disc medium. Each time the rotary table F1 rotates at an angle of 45 degrees, the core support tables F2 move from one position (for example, ST11) to the next position (for example, ST12). A medium check sensor F12 is located to detect the presence of the magnetic recording medium placed at the position ST12. The first operation member F6 engages with the bonding unit F3 placed at the position ST13 to change it from a first position into a second position producing a pushing force so as to bond the magnetic recording disc 1 on the peripheral flange 5 of the center core 3. The second operation member F7 engages with the bonding unit F3 placed at the position ST14 to return it from the second position to the first position releasing the pushing force. The medium height check sensor F8 is located to detect the height of the assembled recording medium placed at the position ST15. If the detected height of the assembled recording medium is in an acceptable range, the recording medium is recovered by a recovery unit F9 located at the position ST16. Otherwise, it is collected into a defective disc recovery box by a recovery unit F10 located at the position ST17. The medium check sensor F11 is located at the position ST18 to check a residual recording medium.

Figure 12:
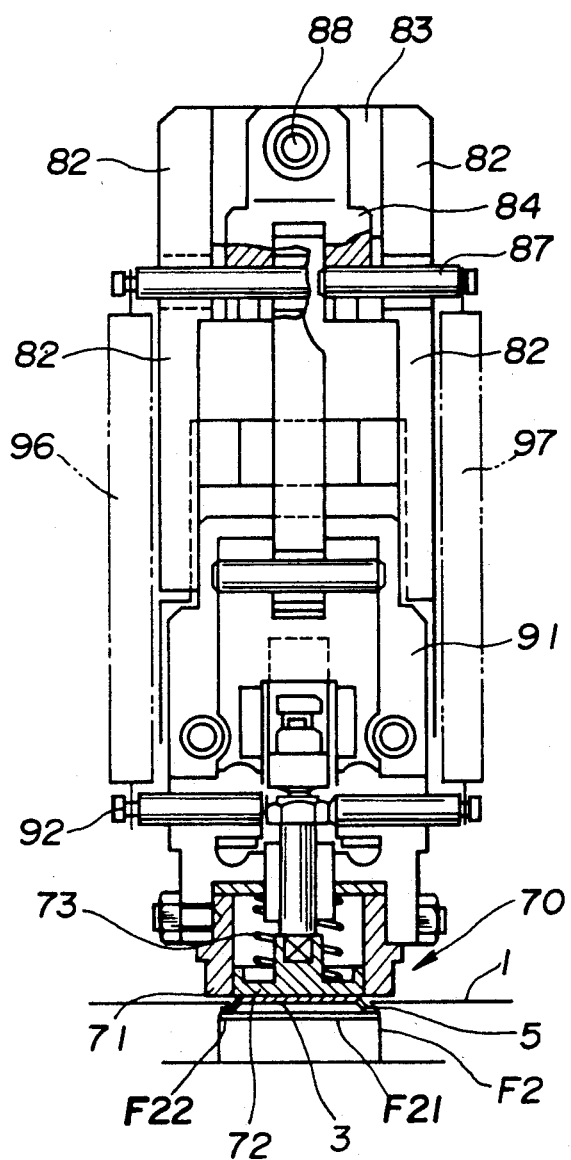
FIG. 12 is an enlarged elevational view of the bonding unit of FIG. 11.

Referring to FIGS. 11 to 14, each of the bonding units F3 includes a pushing tool 70 for association with the corresponding one of the core support tables F2 fixed on the rotary table F1. The core support table F2 has an upper surface generally conforming to the rear surface of a center core 3 to ensure stable placement of the center core 3 thereon. For this purpose, the core support table F2 has a center boss F21 and an annular peripheral shoulder F22 formed along the lower end of the center boss F21. As best shown in FIG. 12, the pushing tool 70 has a cylindrical member 71, a circular piston member 72 placed for sliding movement within the cylindrical member 71, and a spring 73 placed within the cylindrical member 71 to urge the piston member 72 downward. The cylindrical member 71 has an annular end surface for engagement with the annular shoulder F22 of the core support table F2. The circular piston member 72 has a circular plane front surface for engagement with the center boss F21 of the core support table F2.

The pushing tool 70 is reciprocated vertically and radially with respect to the rotary table F1. For this purpose, a vertically movable slide 74 connects the pushing tool 70 to a vertical carriage 75. The slide 74 is adapted to move vertically along ways 76 formed on the vertical carriage 75. The vertical carriage 75 is supported on a horizontally movable slide 77 adapted to move radially of the rotary table F1 along ways 79 formed on a radial carriage 78 secured on the rotary table F1 under the influence of a cam mechanism. This cam mechanism includes first and second guide rollers 80 and 81 fixed on the slide 77. The cam plate F5 is formed in its rear surface with a groove 79 extending in parallel with the peripheral end of the cam plate F5. The first guide rollers 80 is placed in the groove 79 and the second guide roller 81 is placed in engagement with the peripheral end surface of the cam plate F3. The cam plate F5 has such a profile as shown in FIG. 1.

The vertical carrier 75 also carries spaced support plates 82, only one of which is shown, having a spacer 83 secured thereto. An L-shaped bracket 84 is pivotally journalled intermediate its end on a shaft 87 secured to and extending between the support plates 82. The bracket 84 has one end 85 connected to the spacer 83 by a bolt 88 having a compression coil spring 89 (FIG. 14) mounted therearound to urge the bracket 84 in a clockwise direction, as viewed in FIG. 14.

The bonding unit F3 also includes a toggle actuator 90 for producing a pushing force under which the pushing tool 70 pushes a magnetic recording disc 1 against the center core 3 placed on the core support table F2. The toggle actuator 90 includes a link 91 having has a lower end pivotally journalled on a shaft 92 on which the pushing tool 70 is pivotally journalled. The other end of the link 91 is pivotally journalled as at 93 to one end of a toggle lever 94 pivotally journalled intermediate between its end to the other end 86 of the bracket 84. The other end of the toggle lever 94 is provided with a roller 95. As best shown in FIG. 12, a compression coil spring 96 is provided between one end of the shafts 87 and 92 and another compression coil spring 97 is provided between the other end of the shafts 87 and 92.

Figure 13:
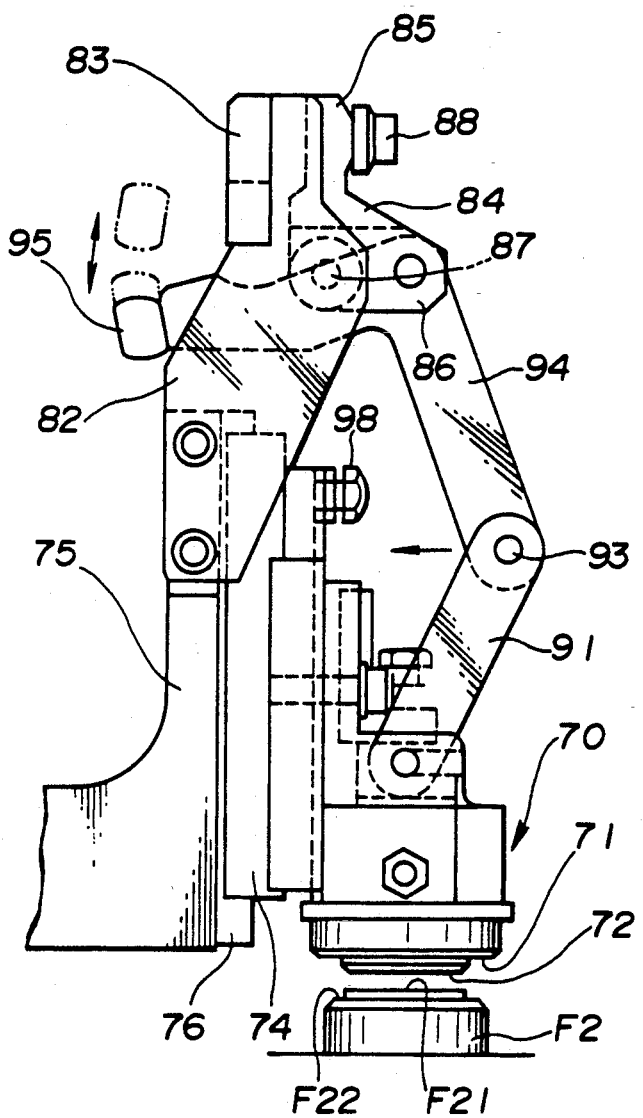
FIG. 13 is an enlarged side view showing a first position of the bonding unit.
Figure 14:
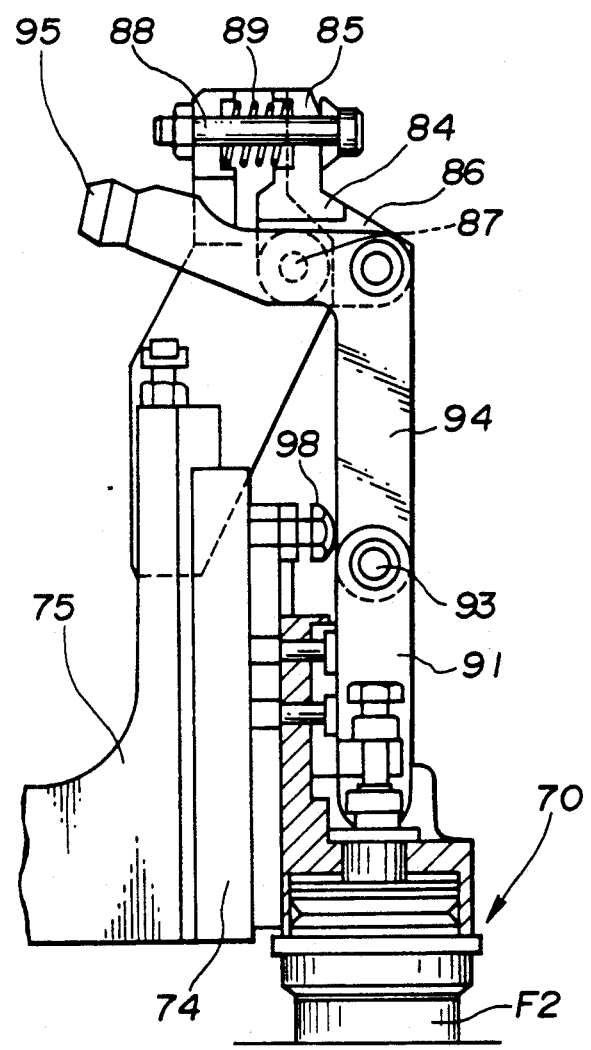
FIG. 14 is an enlarged side view showing a second position of the bonding unit.

Normally, the toggle lever 94 is in a first position, as shown in FIG. 13. As the toggle lever 94 is shifted from the first position to a second position, as shown in FIG. 14, it causes the lever 91 to bring the pushing tool 70 into pressure contact with the core support table F2. When the lever 91 moves past its unstable dead center position shown in FIG. 14, the toggle lever 94 comes into abutment on a stopper 98 secured on the slide 74 to inhibit further movement of the lever 91. When the toggle lever 94 moves from the first position (FIG. 13) toward the second position (FIG. 14), the circular piston member 72 comes into contact with center boss 5 of the center core 3 and then pushes it against the center boss F21 of the core support table F2 under the resilient force of the spring 73 so as to hold the center core 3 in position on the core support table F2. When the toggle lever 94 moves further toward the second position, the cylindrical member 71 comes into contact with the magnetic recording disc 1 and then pushes it against the annular peripheral flange 5 of the center core 3 so as to bond the magnetic recording disc a on the center core 3 through the adhesive 6. During the pushing operation, the pushing tool 71 receives a reaction force from the core support table F2. However, this reaction force is transmitted through the levers 91 and 94 to the bracket 84 and absorbed by the coil spring 89. This is effective to maintain the pushing force applied to the magnetic recording disc 1 at a constant and thus maintain the assembled magnetic recording medium at a constant height. Furthermore, the slide 74 connects the pushing tool 70 to the vertical carrier 75. This is effective to eliminate the tendency of the magnetic recording disc 1 to slip out of position in the area of attachment to the center core 3.

The cam plate F5 has a vertical strut 100 secured on the cam plate F5 at the position ST13 (FIG. 10). The vertical strut 100 supports a position adjusting unit 102 which carries the first operation member F6 at a predetermined height. The first operation member F6 has an inclined cam surface for engagement with the roller 95 provided on the other end of the toggle lever 94. With rotation of the rotary table F1, the roller 95 comes into engagement with the inclined cam surface of the first operation member F6 to gradually move the toggle lever 94 upward from the first position (FIG. 13) to the second position (FIG. 14). A similar operating mechanism is located at the position ST14 (FIG. 10) to carry the second operation member F7. This operating mechanism is substantially the same as the mechanism of FIG. 11 except that the second operation member F7 has a cam surface for engagement with the roller 95, the cam surface being inclined to gradually move the toggle lever 94 downward from the second position (FIG. 14) to the first position (FIG. 13). It is to be understood that the operating mechanisms may be removed and replaced with twin rod cylinders.

Figure 15:
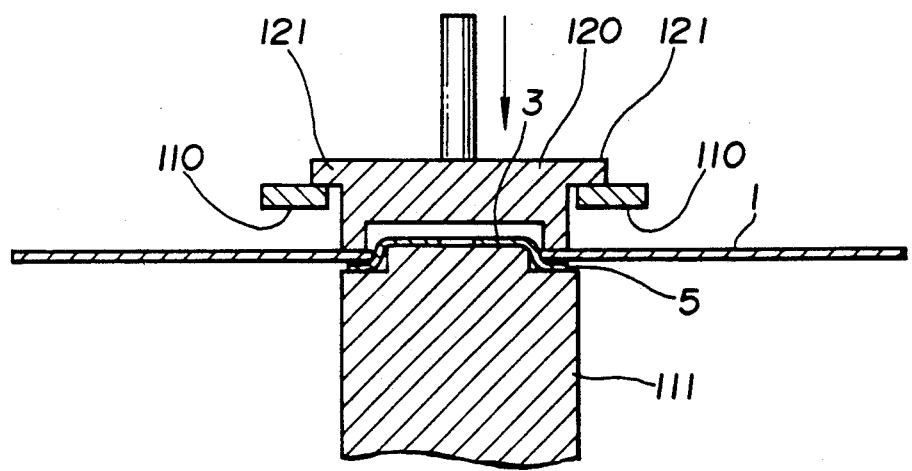
FIG. 15 is a sectional view showing a modified form of the pushing tool used in the bonding unit.

In order to avoid distortion or deformation of the bonded recording medium, it is preferable that the adhesive 6 exhibit a volume change of 10% or less when it changes from the liquid state into the solid state. For this purpose, the adhesive 6 may be one of a solventless, hot-melt adhesive, an epoxy double-fluid adhesive, and a UV hardened adhesive containing acrylic oligomer. Furthermore, it is preferable to adjust the height of the adhesive between the recording disc 1 and the center core 3 by providing a stopper 110 for association with the pushing tool, as shown in FIG. 15. In this case, the pushing tool 120 has a flange 121 for abutment with the stopper 110 when the pushing tool 120 moves downward to push the recording disc 1 onto the peripheral flange 5 of the center core 3 placed on a core support disc 111. The stopper 110 constitutes the limit of further downward movement of the pushing tool 120 and it is effective to maintain the adhesive 6 at a constant height.

In order to avoid deformation or distortion of the bonded recording medium, it is also preferable to increase the degree of cohesion or condensation of the adhesive 6. For this purpose, the adhesive 6 may be a hot-melt adhesive containing 3 to 10 wt % (percent by weight) of calcium carbonate fillers. Calcium carbonate fillers having a size of 3 $\mu$m to 10 $\mu$m has proven satisfactory. If it is smaller than this range, the adhesive has an insufficient bonding strength. If it is larger, the adhesive cannot be discharged smoothly through the nozzle or orifice of the adhesive injector. Preferably, the size of the fillers is in a range of 3 $\mu$m to 7 $\mu$m. Furthermore, the fillers are sedimented particular when the adhesive flows at a small rate. A small amount (as small as 10 to 30 mg) of adhesive is used to bind a recording disc on a center core.

Figure 16:
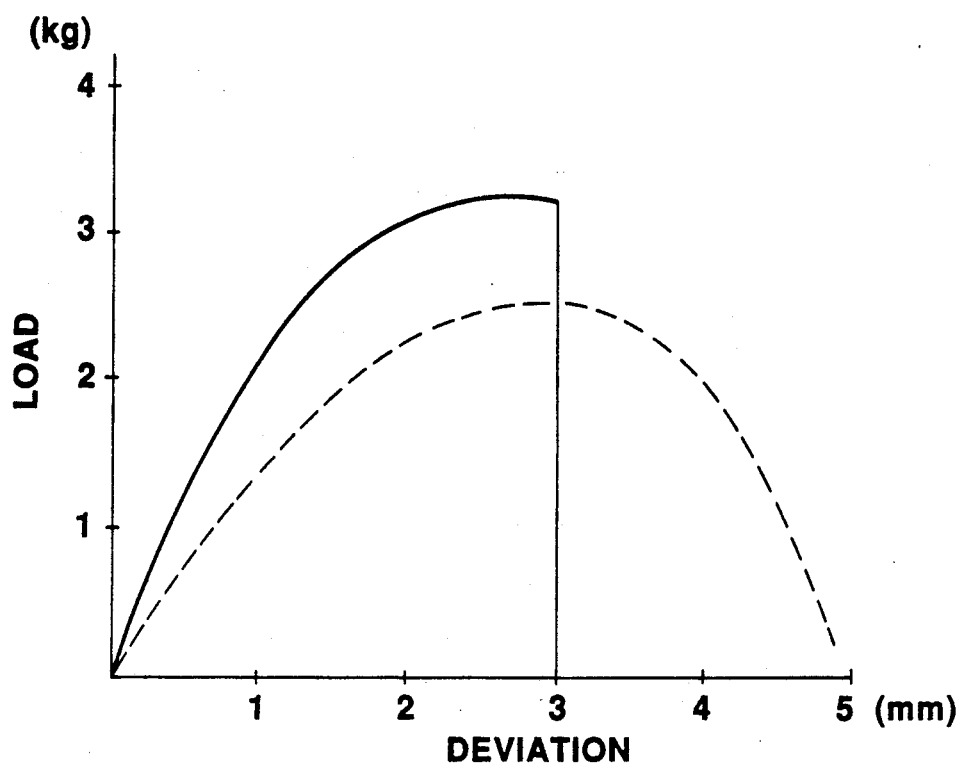
FIG. 16 is a graph showing the result of the shearing test conducted for different types of adhesive.
Figures 17A, 17B:
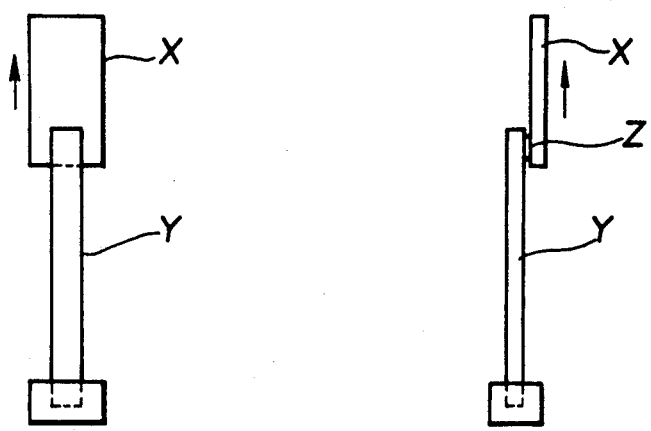
FIGS. 17A and 17B are elevational and side views used in explaining the shearing test.

FIG. 16 shows the results of the shearing tests conducted for different adhesives. The solid curve relates to a filler contained adhesive made in accordance with the invention, and the broken curve relates to an adhesive containing no filler. The shearing test was conducted by pulling a first plate X made of stainless bonded by an adhesive Z to a fixed second plate Y made of the same material as the magnetic recording disc 1, as shown in FIGS. 17A and 17B. The adhesive Z had a thickness of 0.15 mm and a diameter of 6 mm. It is apparent from a FIG. 16 that the filler contained adhesive has a shearing strength much greater than that of the adhesive containing no filler.

Figure 18:
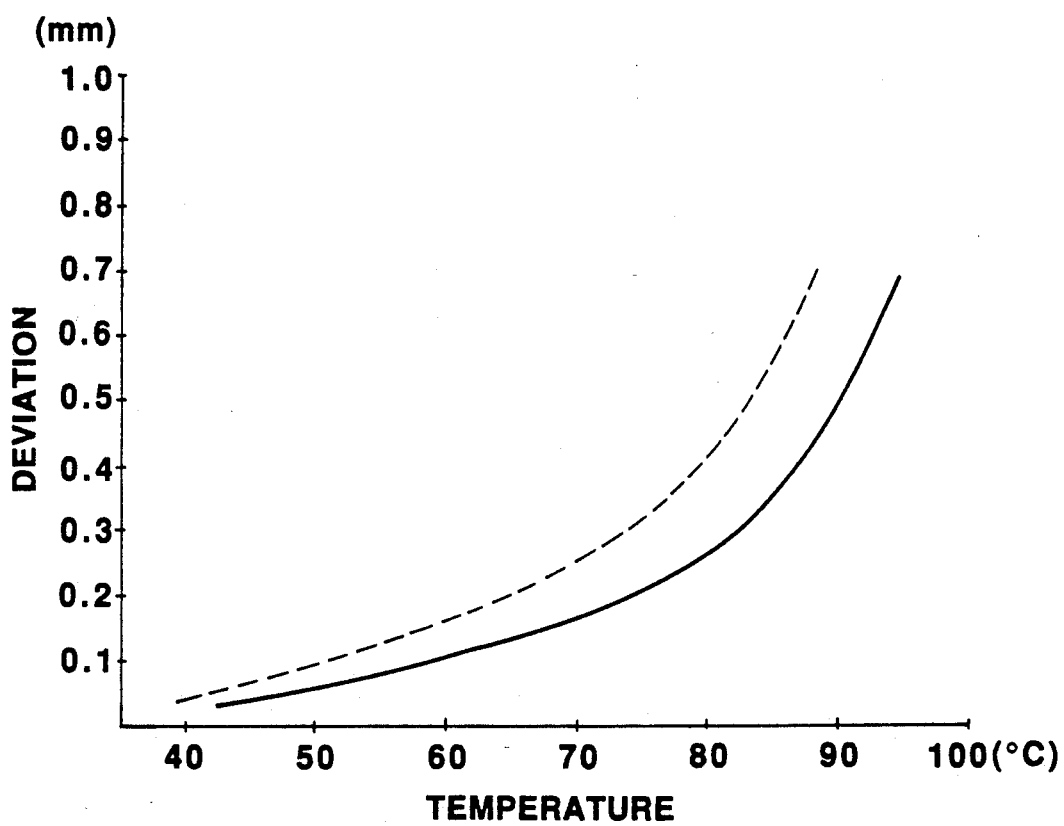
FIG. 18 is a graph showing the creep characteristics obtained for different types of adhesive.

FIG. 18 shows the heat resistance creep characteristics obtained from tests conducted for different adhesives. The solid curve relates to a filler contained adhesive made in accordance with the invention, and the broken curve relates to an adhesive containing no filler. The test was conducted by measuring deviations between the first and second plates A and B while applying a pulling force of 50 gr to the first plate A and increasing the atmospheric temperature from 40° C. to 100° C. It is apparent from FIG. 18 that the filler contained adhesive has an improved heat-resistance creep characteristic as compared to the adhesive containing no filler.

The fillers mixed with a hot-metal adhesive may made of an inorganic material including titanium oxide, zinc oxide and aluminum silicate.

What is claimed is:

1. An apparatus for assembling a recording medium having a recording disc and a center core having an adhesive coated area of attachment to the recording disc, the apparatus comprising:

a horizontal base member;

a support member mounted on the base member;

a core support table secured on the base member for carrying the center core placed thereon;

means for placing the recording disc on the attachment area of the center core placed on the core support table;

a pushing tool slidably mounted on the support member for vertical movement along the support member toward and away from the core support table; and an actuator for moving the pushing tool downward to exert a pushing force on the recording disc against the attachment area of the center core so as to bond the recording disc on the center core, the actuator including resilient biasing means for resiliently biasing the pushing tool against the attachment area of the center core to maintain the pushing force at a constant;

wherein the center core includes a cylindrical center portion having a circular upper end surface, and a peripheral annular flange portion formed along the lower end of the cylindrical center portion, the peripheral flange portion having the adhesive coated area, and wherein the recording disc is formed with a center hole having a diameter for receipt of the center portion of the center core and wherein the pushing tool includes a cylindrical housing having an annular lower end surface for pushing the peripheral flange portion against the core support table, a pushing member placed for sliding movement within the cylindrical housing, the pushing member having a circular lower end surface for pushing the central portion of the center core against the core support table, and a spring for urging the circular pushing member toward the core support table.

2. The apparatus as claimed in claim 1, wherein the pushing tool is connected through a slide to the support member, the slide being adapted to vertically reciprocate along ways formed on the support member.

3. The apparatus as claimed in claim 1, wherein the actuator includes a toggle actuating means having a toggle lever connected for moving the pushing tool to push the recording disc against the attachment area of the center core.

4. The apparatus as claimed in claim 3 wherein the toggle actuating means includes an operation lever having its upper end pivotally journalled to the toggle lever and its lower end pivotally journalled to the pushing tool, and means for moving the toggle lever to bring the operation lever to a dead center position where the pushing tool pushes the recording disc against the attachment area of the center core.

5. The apparatus as claimed in claim 4, wherein the resilient biasing means includes a spring for resiliently urging the toggle lever toward the core support table to absorb a reaction force applied to the pushing tool from the core support table when the operation lever is at the dead center position.

6. An apparatus for assembling a recording medium having a recording disc and a center core, the center core including a cylindrical center portion having a circular upper end surface and a peripheral annular flange portion formed along the lower end of the cylindrical center portion, the peripheral flange portion having an adhesive coated area of attachment to the recording disc, the recording disc being formed with a center hole having a diameter for receipt of the center portion of the center core, the apparatus comprising:

a horizontal base member;

a core support table secured on the base member for carrying the center core placed thereon;

means for placing the recording disc on the attachment area of the center core placed on the core support table;

a pushing tool supported for vertical movement toward and away from the core support table, the pushing tool including a cylindrical housing having an annular lower end surface for pushing the peripheral flange portion against the core support table, a pushing member placed for sliding movement within the cylindrical housing, the pushing member having a circular lower end surface for pushing the central portion of the center core against the core support table, and a spring for urging the circular pushing member toward the core support table; and an actuator for moving the pushing tool downward to push the recording disc against the attachment area of the center core so as to bond the recording disc on the center core.

7. The apparatus as claimed in claim 6, wherein the pushing tool is connected through a slide to a support member mounted on the base member, the slide being adapted to vertically reciprocate along ways formed on the support member.

8. The apparatus as claimed in claim 7, wherein the actuator includes a toggle actuating means having a toggle lever connected for moving the pushing tool to push the recording disc against the attachment area of the center core.

9. The apparatus as claimed in claim 8 wherein the toggle actuating means includes an operation lever having its upper end pivotally journalled to the toggle lever and its lower end pivotally journalled to the pushing tool, and means for moving the toggle lever to bring the operation lever to a dead center position where the pushing tool pushes the recording disc against the attachment area of the center core.

10. The apparatus as claimed in claim 9, wherein the actuator includes a spring for resiliently urging the toggle lever toward the core support table to absorb a reaction force applied to the pushing tool from the core support table when the operation lever is at the dead center position.

* * * * *